(12) United States Patent
Ueno et al.

(10) Patent No.: US 7,265,945 B2
(45) Date of Patent: Sep. 4, 2007

(54) HEAD DRIVE DEVICE INCLUDING HEAD SUPPORT MECHANISM HAVING SUPPORT ARM ROTATABLE RELATIVE TO BASE ARM VIA ROTATION SUPPORT PART, AND DISK APPARATUS INCLUDING THE HEAD DRIVE DEVICE

(75) Inventors: Yoshihiro Ueno, Osaka (JP); Hideki Kuwajima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 352 days.

(21) Appl. No.: 10/514,889

(22) PCT Filed: Jun. 10, 2003

(86) PCT No.: PCT/JP03/07327

§ 371 (c)(1),
(2), (4) Date: Nov. 17, 2004

(87) PCT Pub. No.: WO03/105128

PCT Pub. Date: Dec. 18, 2003

(65) Prior Publication Data

US 2006/0056111 A1    Mar. 16, 2006

(30) Foreign Application Priority Data

Jun. 11, 2002  (JP)  ............... 2002-169553

(51) Int. Cl.
  *G11B 5/60*  (2006.01)
  *G11B 21/21*  (2006.01)
(52) U.S. Cl. ............... 360/245.5; 360/244.2; 360/265.9; 360/245.3
(58) Field of Classification Search ............ 360/245.3, 360/245.5, 244.3, 244.2, 265.9
See application file for complete search history.

(56) References Cited

U.S. PATENT DOCUMENTS

| | | | |
|---|---|---|---|
| 4,748,522 A | | 5/1988 | Takahashi et al. |
| 5,198,945 A | * | 3/1993 | Blaeser et al. ........... 360/245.5 |
| 5,796,554 A | | 8/1998 | Berding et al. |
| 5,864,446 A | * | 1/1999 | Endo et al. .............. 360/244.6 |
| 5,936,803 A | * | 8/1999 | Berding ................... 360/244.8 |
| 5,943,192 A | * | 8/1999 | Utsunomiya ............. 360/245.5 |
| 6,115,221 A | | 9/2000 | Utsunomiya |
| 6,388,843 B1 | | 5/2002 | Takagi et al. |
| 6,587,311 B1 | * | 7/2003 | Niijima et al. ............... 360/255 |
| 6,775,107 B2 | * | 8/2004 | Kasajima et al. ......... 360/294.4 |

(Continued)

Primary Examiner—Jefferson Evans
(74) Attorney, Agent, or Firm—Wenderoth, Lind & Ponack, L.L.P.

(57) ABSTRACT

A head support mechanism of the invention comprises a head (1011) for recording on a disk or reproducing a disk, a head support member composed of this head (1011) and a support arm (2) having this head (1011) attached to one end portion thereof, a base arm (12) including a rotation support part (11) for supporting the head support member rotatably in a direction perpendicular to the surface of the disk, and an elastic member (4) of which one end portion is connected to other end portion of the support arm (2) and other end portion is connected to the base arm (12) for thrusting the head support member in the disk direction. Therefore, the support arm (2) can be formed of a member of high rigidity, and the slider (1) is prevented from colliding against the disk if an impact force acts from outside.

28 Claims, 13 Drawing Sheets

U.S. PATENT DOCUMENTS 6,831,814 B2 * 12/2004 Cha .................. 360/245.3
6,894,873 B2 * 5/2005 Kasajima et al. ........ 360/245.3
2004/0184193 A1 * 9/2004 Honda et al. ............ 360/244.2
2005/0073776 A1 * 4/2005 Honda et al. ............ 360/265.7

* cited by examiner

FIG. 12 – PRIOR ART
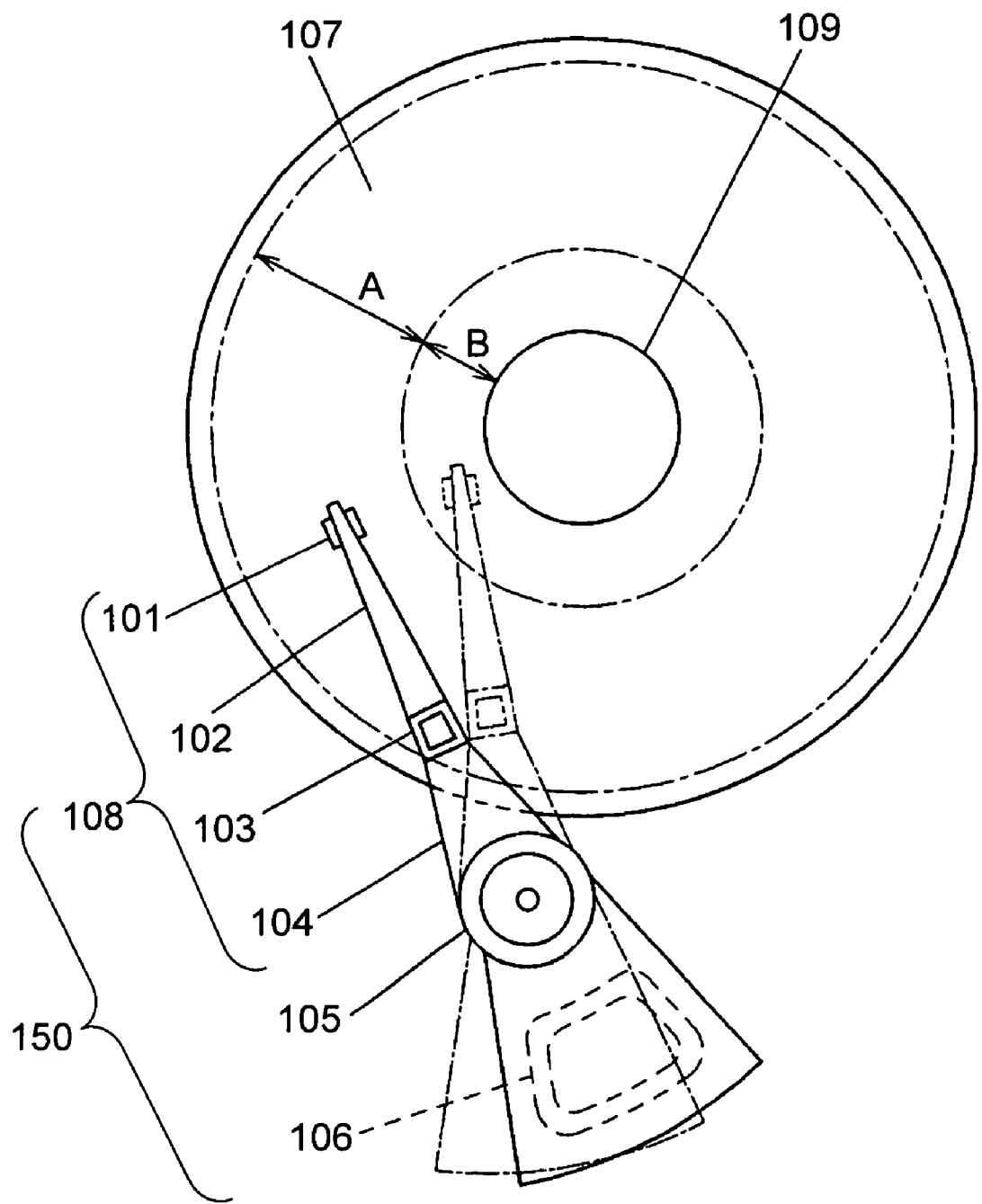

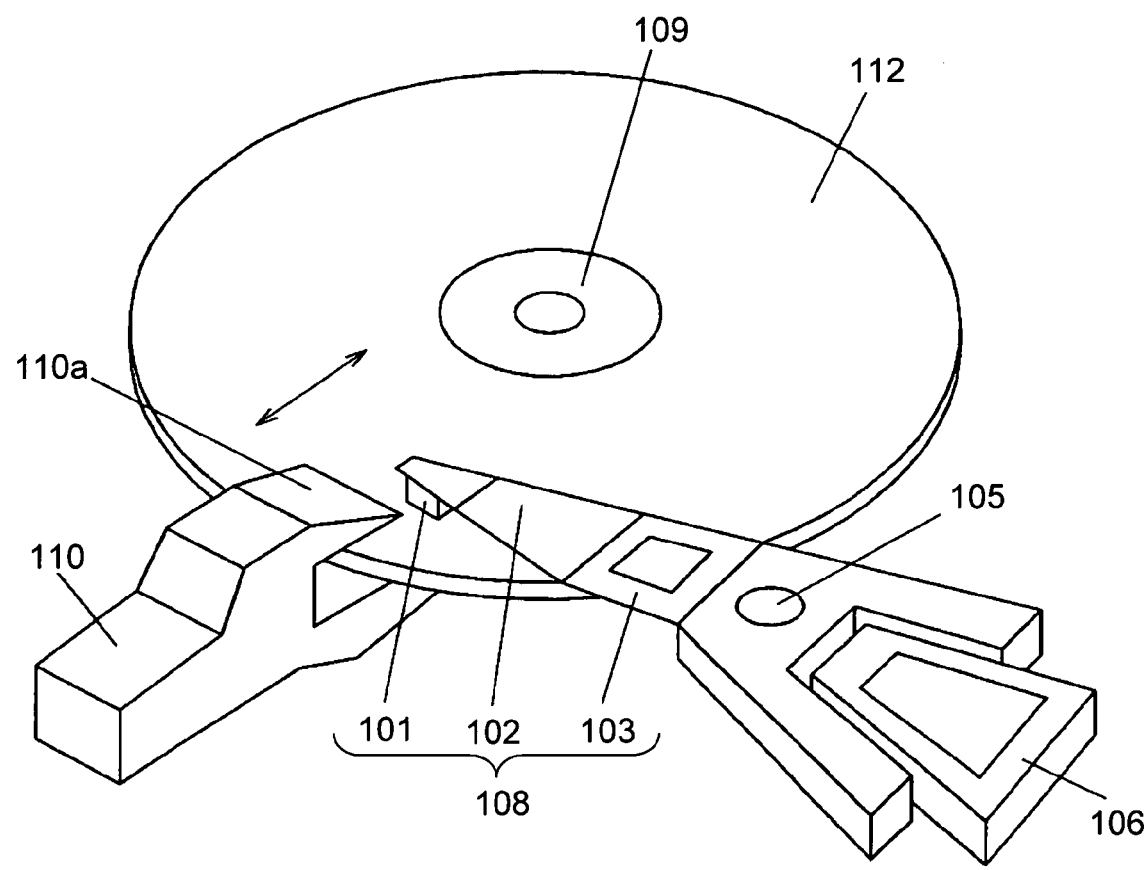
FIG. 13 – PRIOR ART

HEAD DRIVE DEVICE INCLUDING HEAD SUPPORT MECHANISM HAVING SUPPORT ARM ROTATABLE RELATIVE TO BASE ARM VIA ROTATION SUPPORT PART, AND DISK APPARATUS INCLUDING THE HEAD DRIVE DEVICE

This Application is a U.S. National Phase Application of PCT International Application PCT/JP03/07327.

TECHNICAL FIELD

The present invention relates to a head support mechanism and a head drive device for recording and reproducing in a disk by using a floating type head, and a disk apparatus using the same.

BACKGROUND ART

As a conventional example of a head support mechanism using a floating type head, a magnetic disk apparatus such as a hard disk apparatus is explained by referring to FIG. 12.

FIG. 12 is a plan view showing a configuration of a head support mechanism of a conventional magnetic disk apparatus, and the relation of the head support mechanism and a disk. A head support mechanism 108 is composed of a suspension 102 of relatively low rigidity, a flat spring 103, an arm 104 of relatively high rigidity, a slider 101 provided at one end portion of the suspension 102 and at a side facing a disk 107, and a head (not shown) mounted on this slider 101. The suspension 102 is designed at a relatively low rigidity, and the other end portion is folded to compose the flat spring 103, and this flat spring 103 is connected to the arm 104. The arm 104 is rotatably supported by a bearing part 105, and the head support mechanism 108 can be rotated in a specified angle range in a direction parallel to the disk 107 surface by driving means 106 attached to the arm 104. The head support mechanism 108, bearing part 105, and driving means 106 are combined to compose a head drive device 150.

The disk 107 is rotated at a specified speed by rotation driving means 109. At the time of recording or reproducing, owing to the balance of buoyancy by an air stream caused by rotation of the disk 107 and thrusting force of thrusting the slider 101 to the disk 107 surface side, the slider 101 floats at a specific flying height, and the head records or reproduces at this specific flying height. The thrusting force of the slider 101 to the disk 107 surface side is mainly applied from the flat spring 103 of the head support mechanism 108.

That is, at the time of recording or reproduction, the head support mechanism 108 is rotated about the bearing part 105 by the driving means 106. When the head mounted on the slider 101 flys at a specific flying height from the surface of the disk 107, it is positioned in a specified track, and recording or reproducing is carried out.

The magnetic disk apparatus shown in FIG. 12 is a magnetic disk apparatus generally known as a contact start-stop system (CSS system). While rotation of the disk 107 is stopped, the slider 101 contacts with the surface of the disk 107, and when recording or reproducing, the slider 101 floats from the surface of the disk 107. In this CSS system, the recordable region of the disk 107 is an annular region A shown in FIG. 12, and a central annular region B is a waiting region for the slider 101 while rotation of the disk 107 is stopped. When rotation of the disk 107 stops, the slider 101 is moved to region B while floating, and as rotation of the disk 107 slows down, the air stream between the disk 107 and the slider 101 decreases and the buoyancy declines, and finally the slider 101 contacts with the surface of the disk 107 and stops.

Accordingly, in the CSS system, as compared with the surface of region A of the disk 107, the surface of region B is rough, and the slider 101 is prevented from being sucked to the surface of the disk 107 when stopping rotation of the disk 107. If suction occurs, the disk 107 is damaged mechanically and magnetically at the time of start, and it is intended to prevent this inconvenience.

As a method of preventing suction, for example, a load-unload system (L/UL system) is known, in which the slider is moved away from the disk surface when stopping rotation of the disk, and kept in another place. FIG. 13 is a schematic perspective view of this L/UL system magnetic disk apparatus. The elements as in FIG. 12 are identified with the same reference numerals. When stopping rotation of a disk 112, a head support mechanism 108 rotates about the center of a bearing part 105, and a suspension 102 rides on a taper portion 110a of a head holding part 110 provided at the outside of the disk 112. As a result, if the entire surface of the disk 112 is smooth, the slider 101 is not sucked to the disk.

In these head support mechanisms, a specified load is applied to the slider by the flat spring mainly by the thrusting force to thrust in the disk direction, and the suspension has a flexibility. Accordingly, if vertical motion of the disk occurs at the time of recording or reproducing in the disk, the slider can be stably lifted and the head is prevented from being deviated from the specified track to be in an off-track state, and it is also intended to follow up the vertical motion of the disk sufficiently. It is therefore required that the thrusting force necessary for thrusting the slider in the disk surface direction should be securely provided from the flat spring. Besides, since the buoyancy of the slider varies with the manufacturing fluctuations, it is also required to prevent variation of the thrusting force of the slider to the disk surface direction. For this purpose, the suspension may be provided with a notch or formed in a thin plate structure to lower the rigidity and decrease the spring constant, and the head support mechanism is provided with a certain flexibility to absorb fluctuations of the thrusting force.

However, when the suspension is formed in a thin plate structure, the frequency of main resonance point, or the so-called resonance frequency is lowered. As a result, when the head support mechanism is rotated to position at a specified track, a vibration mode such as torsion occurs. It takes a certain time until settling at this vibration mode occurs, and hence the access time cannot be shortened.

Further, in the conventional head support mechanism, its center of gravity is positioned near the head location rather than the flat spring. Accordingly, if a strong impact is applied to the magnetic disk apparatus from outside, the balance of buoyancy by an air stream caused by rotation of the disk and thrusting force of thrusting the slider to the disk side is broken in the slider area, and the slider is likely to pop out from the disk surface. When such popping phenomenon occurs, the slider may collide against the disk, and the disk may be broken magnetically or mechanically. On the other hand, there is an increasing demand for a smaller and thinner magnetic disk apparatus. Hence there is demand for the head support mechanism to be made thinner in order to realize a thin apparatus. Such problems are not limited to the magnetic disk apparatus, but are commonly seen in the disk apparatus having a floating head, for example, an optical disk apparatus or a magneto-optical disk apparatus.

SUMMARY OF THE INVENTION

The invention is intended to solve the problems of the prior art, and it is hence an object of the invention to present a thin type head support mechanism capable of applying a sufficient thrusting force to the head, having a high flexibility, and which is excellent in impact resistance, and also a head drive device, and a disk apparatus using the same.

The head support mechanism of the invention comprises a head for at least one of recording on a disk and reproducing from the disk, a head support member including this head and a support arm having this head attached to one end portion thereof, a base arm including a rotation support part for supporting the head support member rotatably in a direction perpendicular to a surface of the disk, and an elastic member of which one end portion is connected to other end portion of the support arm and the other end portion is connected to the base arm for thrusting the head support member in a direction of the disk.

In this configuration, since the head support member is attached to the base arm by way of the elastic member, the rigid member and elastic member may be individually fabricated with an optimum design. Therefore, the support arm portion can be formed of a highly rigid material, and if an impact acts from outside, the slider is prevented from colliding against the disk, and its resonance frequency can be set high. It is also easy to set freely the thrusting force by the elastic member to the slider. Therefore, the head support mechanism of very high resistance to impact, high response, and high access speed can be realized.

In the head support mechanism of the invention, preferably, the head is mounted on a slider and attached to one end portion of the support arm by way of the slider, and the head support member is formed of the slider and the support arm. In this configuration, in the floating type disk apparatus, the head can be caused to fly at a specified flying height during recording or reproducing.

In the head support mechanism of the invention, preferably, the head is mounted on the slider, and attached to one end portion of the support arm by way of the slider, and a balance member is formed at other portion of the support arm, and the head support member is formed of the slider, the balance member and the support arm. In this configuration, if impact acts on the head support mechanism from outside, the rotational moments by the slider, the balance member and the support arm can be balanced, and the slider is prevented from colliding against the disk.

It is also a feature of the head support mechanism of the invention that the balance member can be formed of an amplifier circuit for amplifying an electric signal of the head. In this configuration, since the amplifier circuit is used as the balance member for improving the impact resistance, a thinner and more functional head support mechanism can be realized.

In the head support mechanism of the invention, preferably, a position of a center of gravity of the head support member is disposed within a vertical plane drawn from a rotation axis of the rotation support part of the base arm to a surface of the disk. In this configuration, if an impact is applied to the disk apparatus using the head support mechanism in a direction perpendicular to the disk surface from outside, since the center of gravity of the head support member is located within the vertical plane extending from the rotation axis a perpendicular to the disk surface, the head support member is not rotated. Hence, the slider hardly collides against the disk, and a head support mechanism excellent in impact resistance is realized.

In the head support mechanism of the invention, preferably, a position of a center of gravity of the head support member is located on the rotation axis of the rotation support part formed on the base arm. In this configuration, if an impact is applied to the disk apparatus using the head support mechanism in a direction perpendicular or parallel to the disk surface from outside, since the center of gravity of the head support member is located on the rotation axis, the head support member is not rotated in either direction. Hence, the slider hardly collides against the disk, and a head support mechanism excellent in impact resistance is realized.

In the head support mechanism of the invention, preferably, the elastic member includes a flat spring formed between the rotation support part and support arm. In this configuration, despite a very thin structure, a head support mechanism capable of setting a necessary thrusting force for the slider relatively freely is realized.

In the head support mechanism of the invention, preferably, the rotation support part includes a pivot portion having at least one apex on the base arm contacting with the support arm, and the contacting point of the apex of the pivot portion and the support arm is used as the fulcrum, and the head support member is rotatable at the fulcrum in a direction perpendicular to a surface of the disk. In this configuration, the center of rotation can be determined precisely, and the head positioning control is accurate. Moreover, the structure of the rotation support part provided in the base arm can be fabricated easily, and the head support mechanism is simple in structure.

In the head support mechanism of the invention, preferably, a pair of pivot portions are provided, and a contacting point of an apex of the pair of pivot portions and the support arm is used as the fulcrum, and the head support member is rotatable at the fulcrum in a direction perpendicular to a surface of the disk. In this configuration, since the head support member is defined in rotation only in the perpendicular direction, positioning off-track does not occur when positioning to a desired track, and positioning of high precision is realized.

In the head support mechanism of the invention, preferably, the flat spring and support arm are in an integrally formed structure. Therefore, the flat spring and support arm can be manufactured simultaneously, and the manufacture and assembling process of the head support structure is simplified.

Further, the head drive device of the invention comprises a head support mechanism, a bearing part for supporting the head support mechanism rotatably in a direction parallel to the surface of the disk, and driving means for rotating the head support mechanism at the surface of the disk, and this head support mechanism has the configuration as described above. In this configuration, a head drive device of large impact resistance, thin type, and high access speed is realized.

In the head drive device of the invention, preferably, there is only one of the bearing parts, which supports a plurality of head support mechanisms, and the plurality of head support mechanisms are configured so that the head attached to each end portion of the head support mechanism confronts the surface of disk. Therefore, if used in a hard disk apparatus using a plurality of disks, a head drive device of a favorable impact resistance is realized.

The disk apparatus of the invention comprises a disk, rotation driving means for driving this disk, and the head drive device for writing in a specified track position of the disk or reading from a specified track position, and the head drive device has the configuration as described above. In this configuration, a small and thin disk apparatus of large impact resistance and high access speed is realized.

BRIEF DESCRIPTION OF THE DRAWINGS

FIG. 12 is a plan view showing a configuration of a head support mechanism of a conventional CSS system magnetic disk apparatus, and the relation of the head support mechanism and a disk.

FIG. 13 is a schematic perspective view showing a configuration of a conventional L/UL system magnetic disk apparatus.

DETAILED DESCRIPTION OF PREFERRED EMBODIMENTS

Referring now to the accompanying drawings, the head support mechanism, head drive device, and disk apparatus in embodiments of the invention are specifically described below.

Embodiment 1

Figure 1:
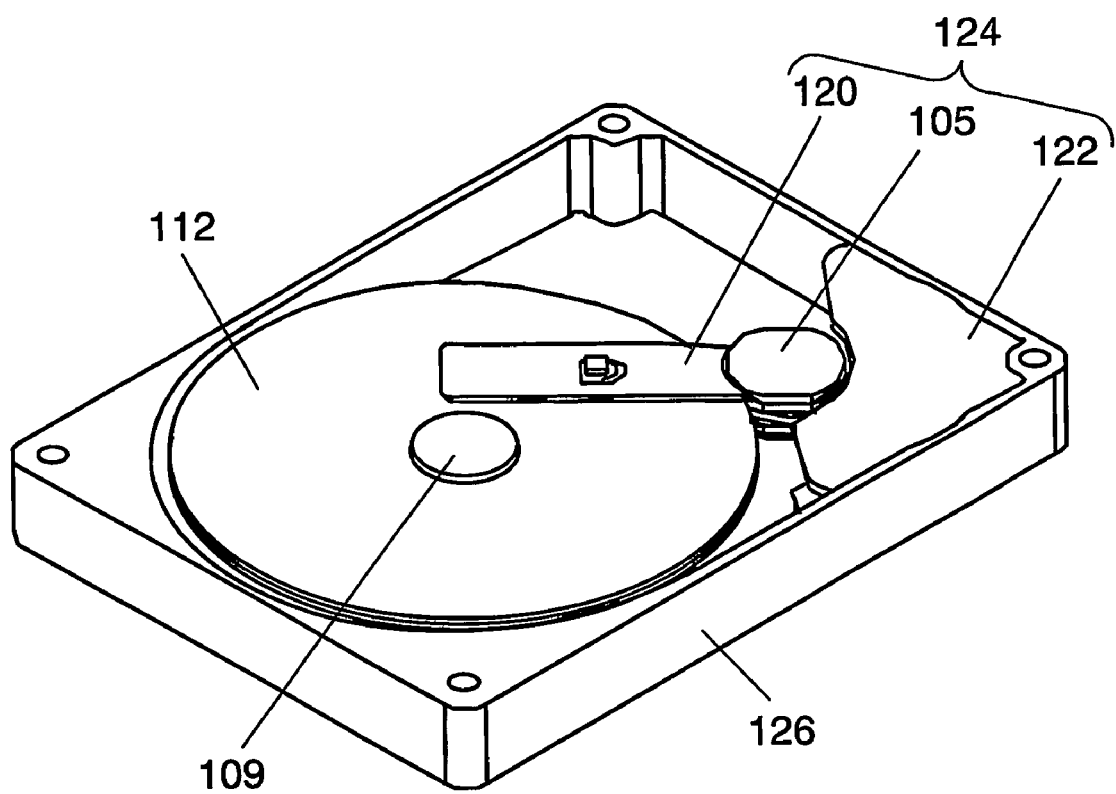
FIG. 1 is an essential perspective view of a disk apparatus using a head support mechanism of the invention.

FIG. 1 is an essential perspective view of a disk apparatus using a head support mechanism in embodiment 1 of the invention. In this embodiment, the disk apparatus is a magnetic disk apparatus. The elements as in FIG. 12 and FIG. 13 are identified with the same reference numerals. A head support mechanism 120 is rotatably supported about a bearing part 105, and can be positioned at a desired track position of a disk 112 by operating driving means 122. The head support mechanism 120, bearing part 105, and driving means 122 are combined to compose a head drive device 124. As the driving means 122, for example, a voice coil motor may be used.

The disk 112 can be rotated at a specified speed by rotation driving means 109. As the rotation driving means 109, for example, a spindle motor may be used. A casing 126 holds these components in a specified configuration, and is sealed by a lid body (not shown), and deterioration of the disk 112 or head (not shown) due to invasion of corrosive gas or dust is prevented.

Figure 2:
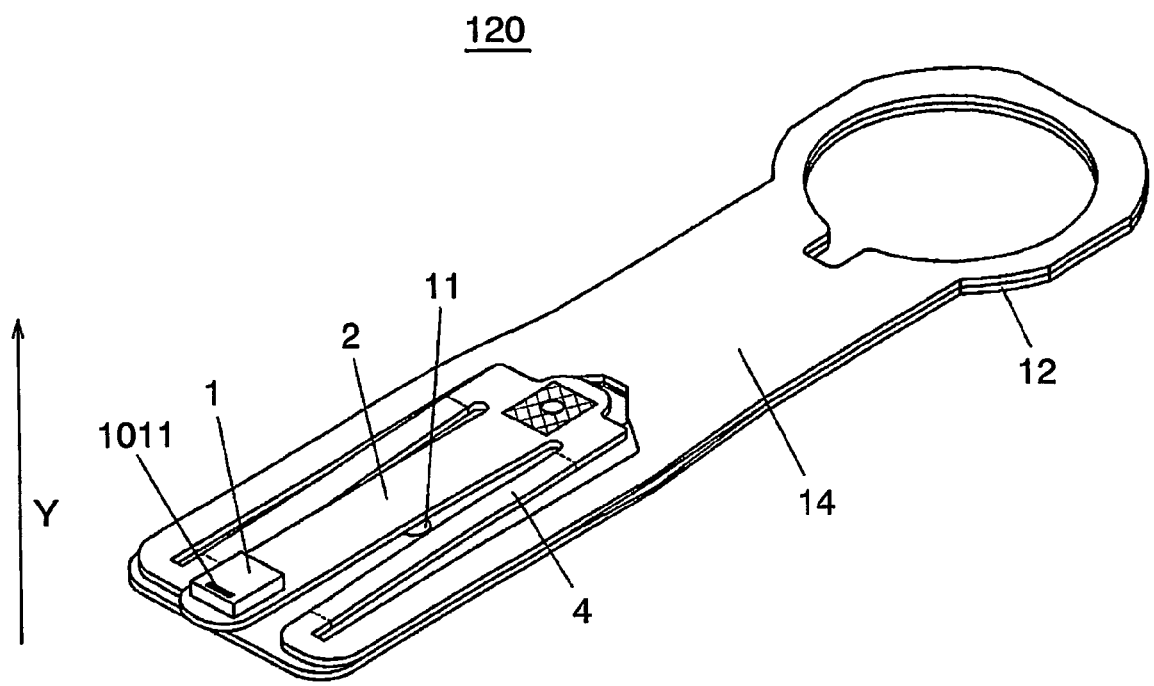
FIG. 2 is a perspective view as seen from the disk surface side of the head support mechanism in embodiment 1 of the invention.
Figure 3:
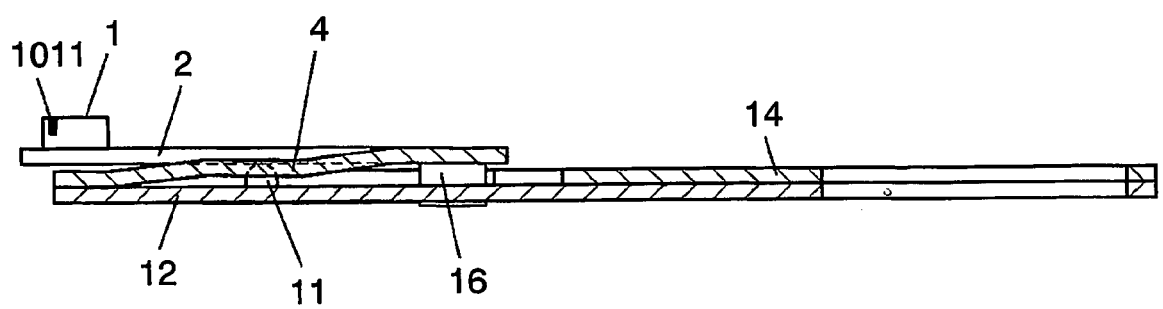
FIG. 3 is a side view near a rotation support part with the disk surface up of the head support mechanism in the embodiment.
Figure 4:
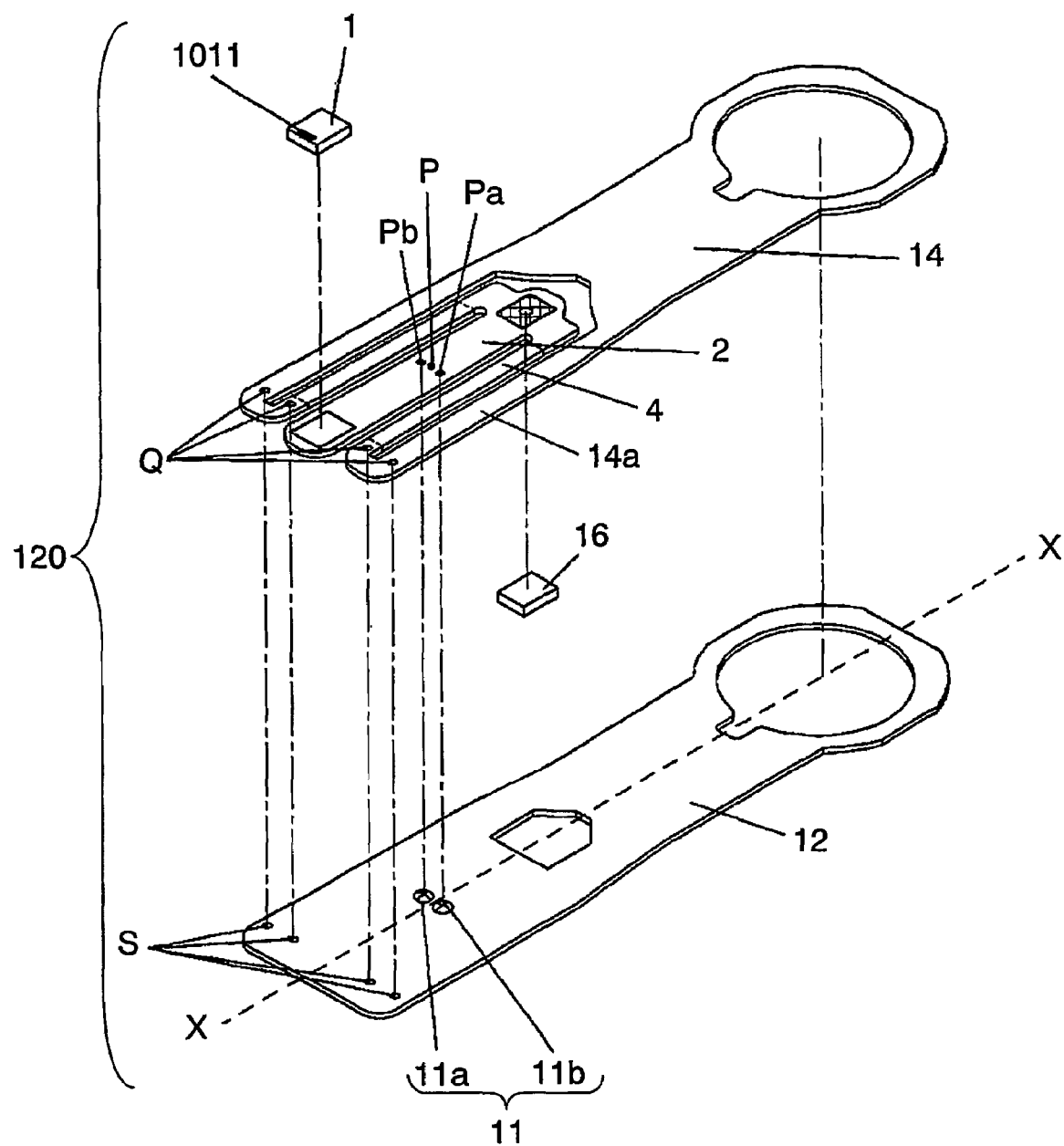
FIG. 4 is a perspective exploded view as seen from the disk surface side of the head support mechanism in the embodiment.

FIG. 2 to FIG. 4 explain the detailed structure of the head support mechanism 120. FIG. 2 is a perspective view of the entire structure as seen from the disk 112 surface side, FIG. 3 is a side view near a rotation support part with the disk 112 surface side up, and FIG. 4 is similarly a perspective exploded view as seen from the disk 112 surface side. Referring to these drawings, the head support mechanism 120 of embodiment 1 is explained below.

As shown in FIG. 4, an elastic member 4, a support arm 2, and an arm plate 14 are formed by processing one plate material. In this embodiment, the elastic member 4 is formed of a flat spring by processing a plate material as shown in FIG. 4. In this embodiment, hereinafter, the elastic member 4 is described as flat spring 4. Flat springs 4 are provided at both sides of the support arm 2, and they are connected to extensions 14a of the arm plate 14 at their end portions. The flat springs 4 are also connected to the end portion sides for mounting a balance member 16 of the support arm 2. The flat springs 4 and the extensions 14a of the arm plate 14 are affixed to a base arm 12 at positions Q and S by, for example, laser welding.

The base arm 12 has a pivot portion composed of a pair of apices 11a, 11b, and a rotation support part 11 is composed of this pivot portion. The support arm 2 abuts against the pivot portion which is the rotation support part 11, and is elastically held by way of the flat spring 4, and can be rotated about the rotation support part 11 only in a direction perpendicular to the surface of the disk 112. The pair of apices 11a, 11b of the pivot portion as the rotation support part 11 abut against two positions Pa, Pb of the support arm 2 as shown in FIG. 4. Therefore, by the elastic force of the flat spring 4, the end portion side of the support arm 2 in which the slider 1 is fixed is forced in the direction perpendicular to the surface of the disk 112 (direction Y in FIG. 2), and a compressive stress occurs at the contacting points Pa, Pb at this time. The line linking the contacting points Pa and Pb is the axis of rotation.

In the support arm 2, further, the balance member 16 is affixed at the side end portion opposite to the end portion where the slider 1 is affixed, by reference to the rotation support part 11, and at the opposite side surface. The apices 11a, 11b of the pivot portion as the rotation support part 11 are disposed on a line at a right angle to the central line (line X-X) in the longitudinal direction of the support arm 2 and at symmetrical positions with respect to the central line (line X-X) as shown in FIG. 4. Therefore, during operation of the magnetic disk apparatus, that is, in a floating state of the slider 1 from the disk 112, the thrusting force on the slider 1 is generated by the compressive stress of the apices 11a, 11b of the rotation support part 11 on the support arm 2. In this manner, the head support mechanism 120 as shown in FIG. 2 and FIG. 3 is formed.

Figure 5:
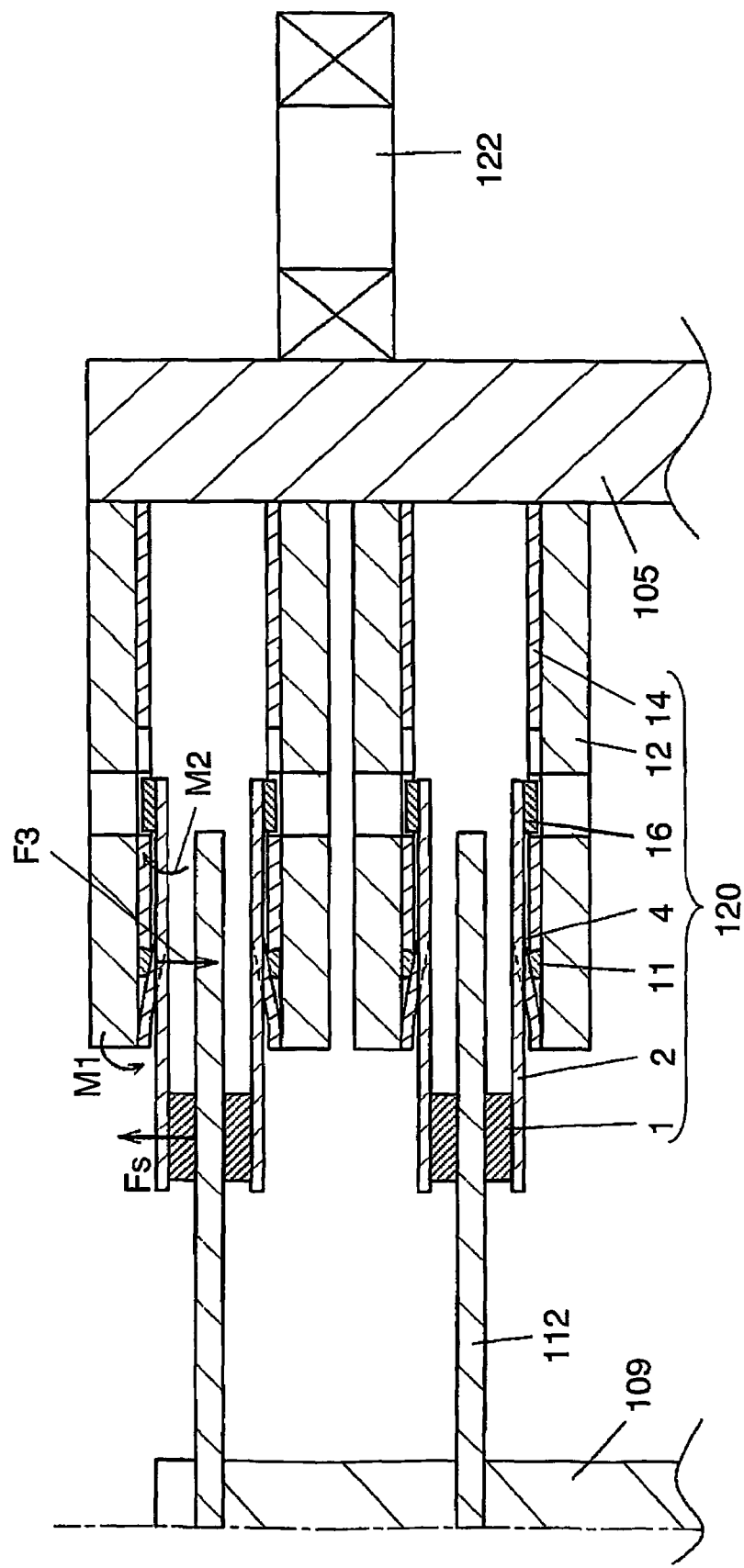
FIG. 5 is an essential sectional view of a magnetic disk apparatus in the embodiment.

FIG. 5 is an essential sectional view of the magnetic disk apparatus for recording and reproducing on both sides of two disks 112 by using four head support mechanisms 120. The same elements as in FIG. 1 to FIG. 4 are identified with the same reference numerals. As clear also from FIG. 5, the four head support mechanisms 120 are connected to one bearing part 105, and rotated simultaneously by driving means 122. Sliders 1 attached to end portions of the head support mechanisms 120 are disposed at confronting sides respectively at both sides of each disk 112. In FIG. 5, the force acting on the head support member is schematically shown by using one of the four head support mechanisms 120. In this embodiment, each head support member is composed of the slider 1 on which a head 1011 is mounted, the support arm 2, and the balance member 16.

For each head support mechanism 120, rotational moments M1, M2 generated by the flat spring 4 act on the head support member as shown in the drawing, and force F3 for pressing the head support member composed of the slider 1, balance member 16 and support arm 2 acts on the central axis of the rotation support part 11. By these forces, the slider 1 receives reaction force Fs from the disk 112. That is, the force confronting this reaction force Fs is the thrusting force. This thrusting force can be set arbitrarily depending on the material and thickness of the flat spring 4, height of apices 11a, 11b of the rotation support part 11, or affixing position of the support arm 2 and flat spring 4. For example, a large thrusting force may be applied by making the flat spring 4 of a rigid material and of a greater thickness. Or a large thrusting force may be applied by increasing the height of the apices 11a, 11b of the rotation support part 11.

Figure 6:
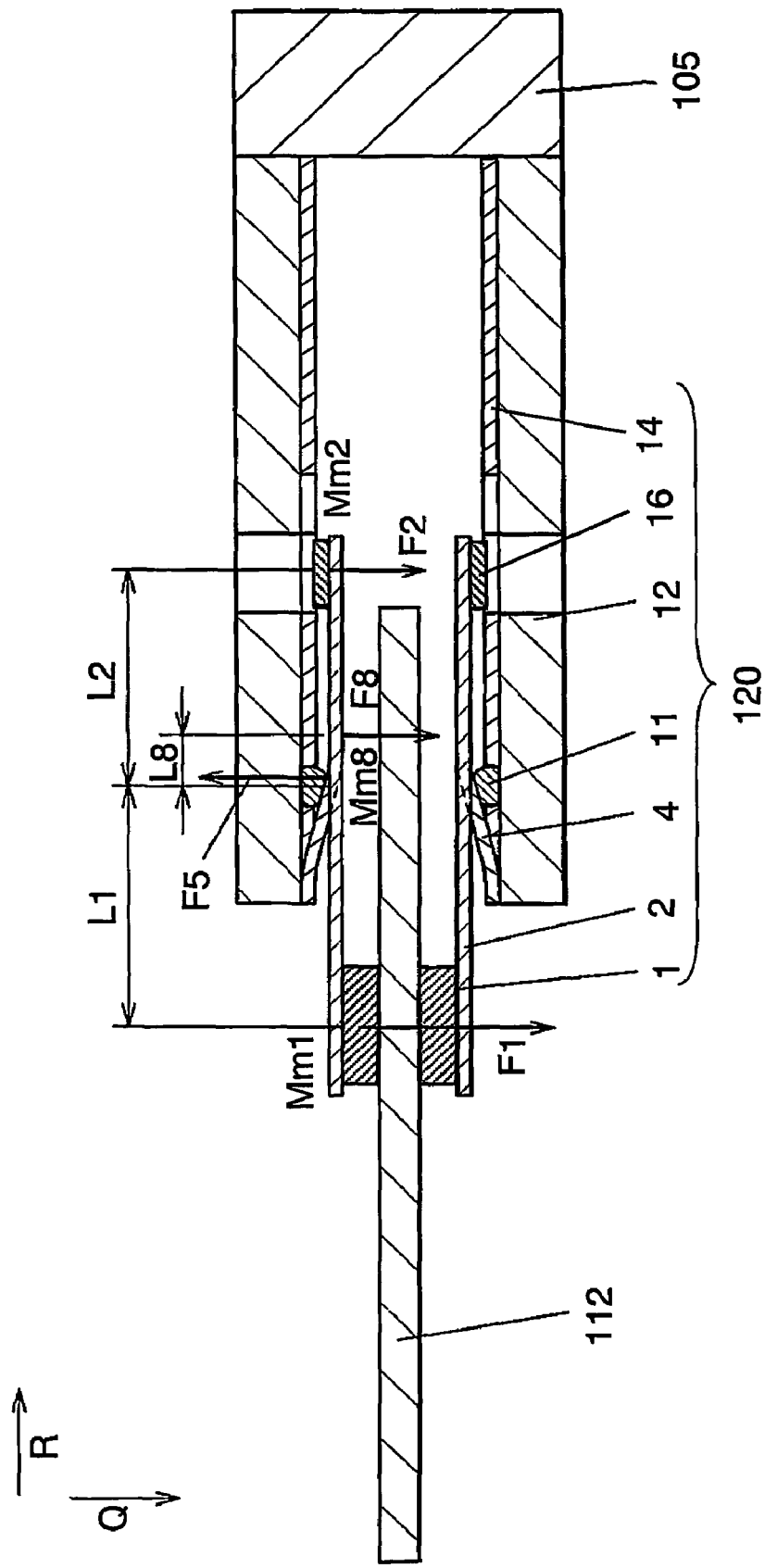
FIG. 6 is a diagram for explaining the operation of the embodiment, being a sectional view showing two head support mechanisms and one disk only.

Setting the position of the center of gravity of the head support member is explained by referring to FIG. 6. FIG. 6 is a diagram for explaining the operation of the embodiment, and it is a sectional view showing two head support mechanisms 120 and one disk only. By reference to the axis of rotation of the rotation support part 11, the distance to the center of gravity of the slider 1 is supposed to be L1, the distance to the center of gravity of the balance member 16 to be L2, the mass of the slider 1 to be Mm1, and the mass of the balance member 16 to be Mm2. When the center of gravity of the support arm 2 is not located on the rotation support part 11, supposing the mass of the rotatable portion of the support arm 2 to be Mm8 and the distance from the rotation support part 11 to the rotatable portion to be L8, the mass Mm2 of the balance member 16 should be set so as to satisfy the formula $L1 \times Mm1 = L2 \times Mm2 + L8 \times Mm8$.

When the center of gravity of the support arm 2 is set so as to be located on the axis of rotation of the rotation support part 11, the mass Mm2 of the balance member 16 is set so as to satisfy the formula $L1 \times Mm1 = L2 \times Mm2$.

When the center of gravity of the head support member is set in this manner, when impact force acts, the slider 1 is prevented from colliding against the disk 112. For example, suppose an impact force acts in direction Q in FIG. 6. An impact force F1 proportional to the mass Mm1 acts on the slider 1. An impact force F2 proportional to the mass Mm2 acts on the balance member 16. An impact force F8 proportional to the mass Mm8 acts on the rotatable portion of the support arm 2.

At this time, since the head support member is set to satisfy the relation of $L1 \times Mm1 = L2 \times Mm2 + L8 \times Mm8$, the relation of $L1 \times F1 = L8 \times F8 + L2 \times F2$ is established if these impact forces are applied. As a result, rotating force about the axis of rotation of the rotation support part 11 does not occur in the head support member. Therefore, the slider 1 is prevented from colliding against the surface of the disk 112 to damage the head 1011 or disk 112. That is, when the center of gravity of the head support member is designed to be located substantially at the same position as the middle point P (shown in FIG. 4) on the line linking contacting points Pa, Pb of the support arm 2 with the apices 11a, 11b of the rotation support part 11, a stable head support mechanism 120 of less vibration against external impacts can be realized. Thus, the head support mechanism having the greatest resistance to impact is realized when the position of the center of gravity of the head support member coincides with the middle point P, but as far as existing on the line linking the points Pa and Pb, if slightly deviated from the middle point P, a head support mechanism having a sufficiently practical resistance to impact is realized.

Supposing the force acting between the head support member and rotation support part 11 to be F5, as far as the relation is $F1+F8+F2>F5$, the pivot portion of the rotation support part 11 and the head support member will separate apart from each other. If, however, the relation is $F1+F8+F2 \leq F5$, the pivot portion and the head support member will not separate apart from each other. The force F5 for satisfying such relation is generated by the stress originating from the rotational moments M1, M2 caused by the flat spring 4 as explained in FIG. 5, but this force can be set freely as explained above. Therefore, it is easy to keep the pivot portion and head support member in tight contact despite application of impact forces.

Further, in direction R in FIG. 6, that is, in a direction parallel to the surface of the disk 112, it is configured to match the center of gravity between the axis of rotation of the rotation support part 11 and the head support member. As a result, if an impact force acts in direction R, rotational moment is not generated in the head support member, and the slider 1 is prevented from colliding in the direction of the disk 112.

As explained herein, in the head support mechanism of the invention, it is possible to have flexibility and increase rigidity of the entire structure including the support arm while increasing the thrusting force to the slider. At the same time, since they can be set also independently as actions of individual constituent elements, the design of the head support mechanism is easy, and the degree of freedom of design can be expanded.

By forming the head support mechanism 120 in such configuration, moreover, the support arm 2 can be fabricated by using a material of high rigidity. When the support arm 2 is made of a material of high rigidity, the resonance frequency of the support arm 2 can be increased, and the conventional problem of vibration mode is eliminated. Therefore, settling is not needed, and it is possible to position by rotating the support arm 2 at high speed, and hence the access speed of the magnetic disk apparatus can be enhanced.

Furthermore, with the head support mechanism of the embodiment, a precision forming process (bending process) of the flat spring as required for the conventional head support mechanism is not necessary, and the head support mechanism can be manufactured in a simple process.

In this embodiment, the flat spring is used as the elastic member 4, but the invention is not limited to this material. For example, a linear spring member may be used, or a plurality of linear spring members may be used. Alternatively, instead of a single layer of flat spring, a laminated structure of layers of spring plate may be used, or the elastic member may be made of a different material from the arm plate, and later assembled together.

Embodiment 2

Figure 7:
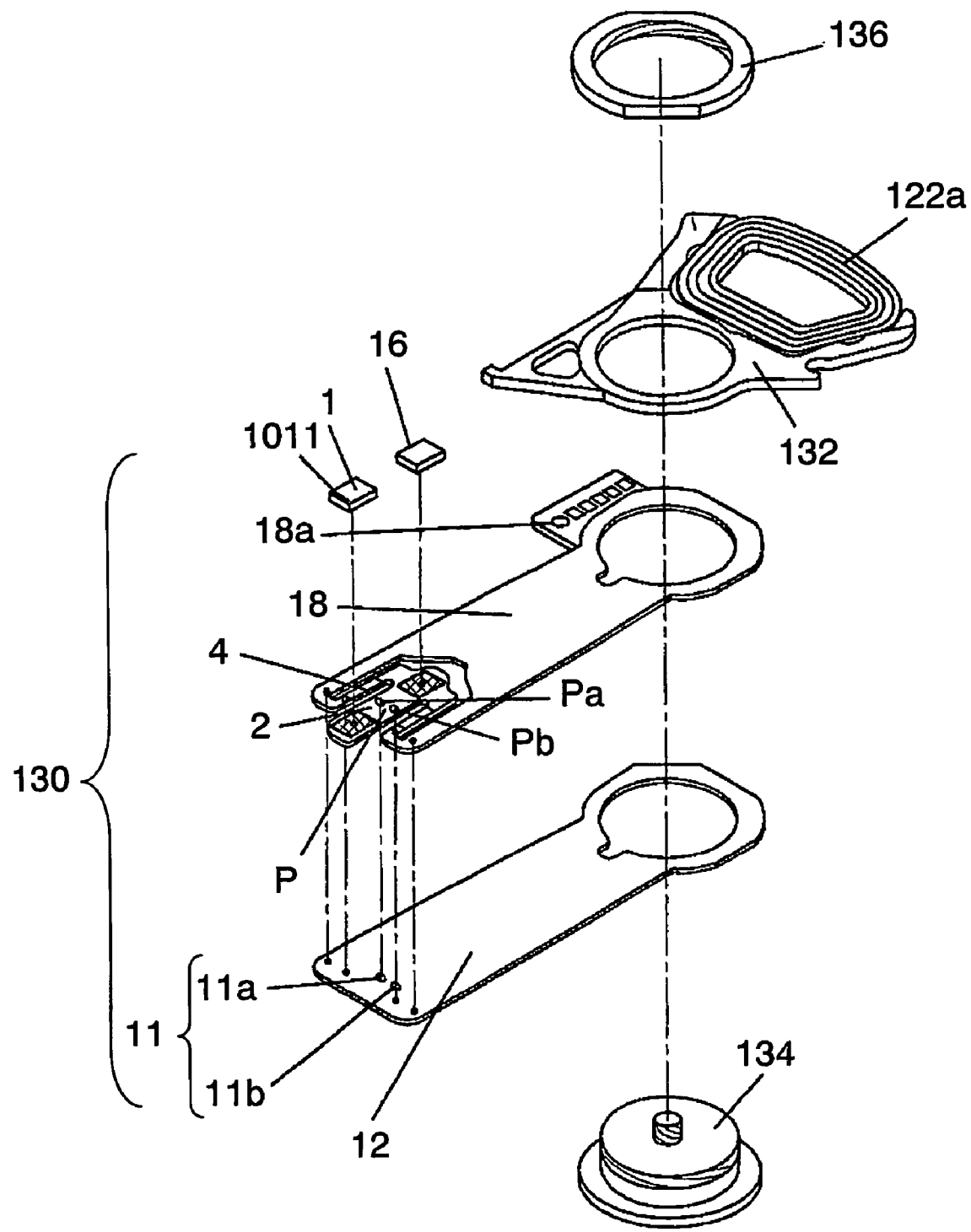
FIG. 7 is a perspective exploded view as seen from the disk surface side of a head support mechanism in embodiment 2 of the invention.

FIG. 7 is a perspective exploded view as seen from the disk surface side of a head support mechanism in embodiment 2 of the invention. This head support mechanism 130 can be also used in the disk apparatus shown in FIG. 1. The same elements as in FIG. 2 to FIG. 4 are identified with the same reference numerals.

The head support mechanism 130 of embodiment 2 is similar to the head support mechanism 120 in embodiment 1, except that an arm plate 18 and a flexible wiring connection part 18a are integrally formed near a bearing part 134 of the arm plate 18, and that a balance member 16 is mounted on the same plane side as a slider 1. This head support mechanism 130 and a second base arm 132 fixing a voice coil 122a are inserted on the bearing part 134 in the shown sequence, and fixed with a threaded part 136. A magnet (not shown) confronts the voice coil 122a, and a head drive device is composed. A signal from a head 1011 passes through a wiring (not shown) formed on the arm plate 18, and is connected to the flexible wiring connection part 18a.

In the case of the head support mechanism 130 of embodiment 2, the force acting on the head support member is the same as in the case of the head support mechanism 120 of embodiment 1. In this embodiment, too, the head support member is composed of the slider 1 on which the head 1011 is mounted, the support arm 2, and the balance member 16.

Figure 8:
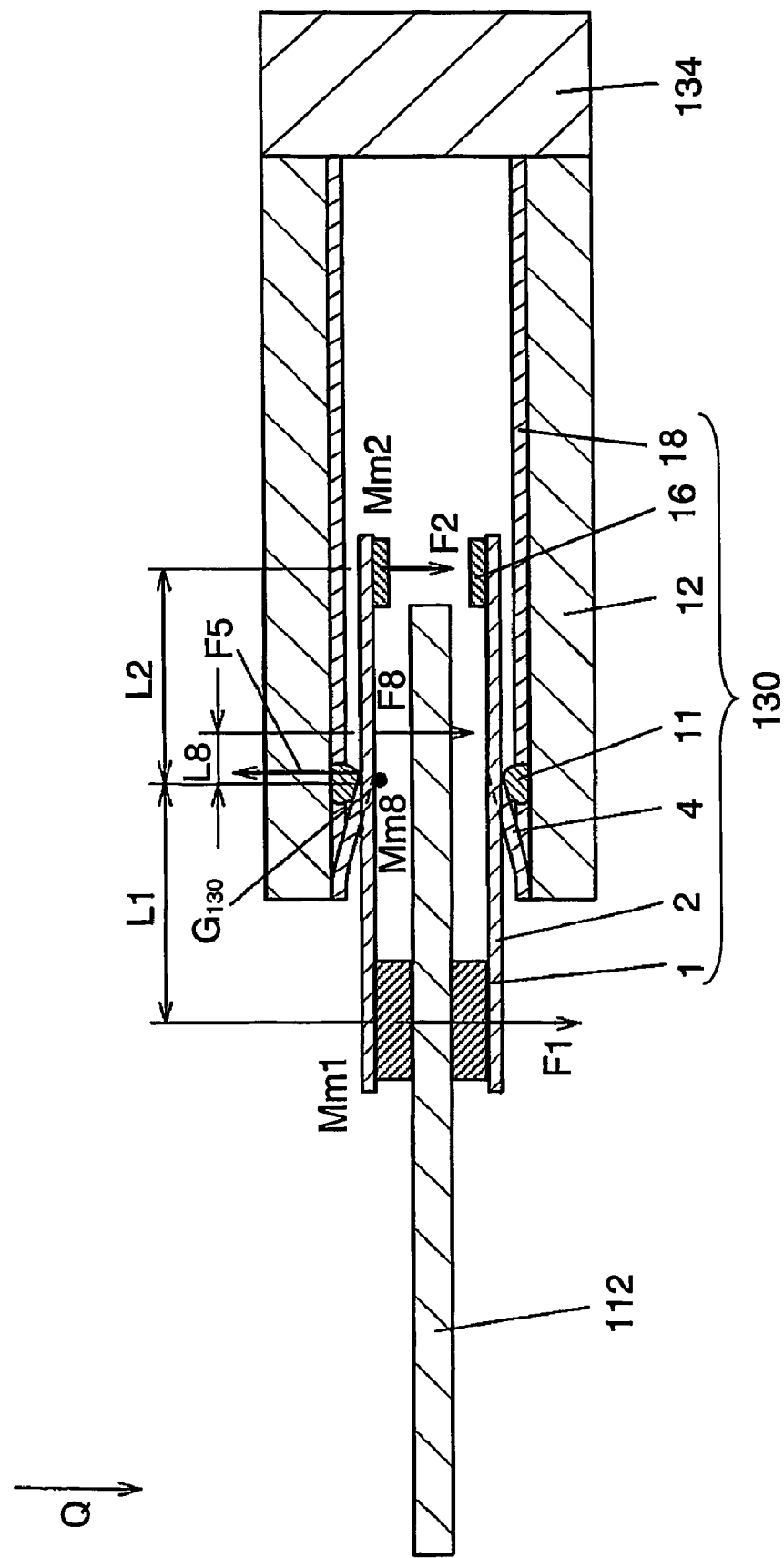
FIG. 8 is a side view showing the principle of configuration of the head support mechanism in embodiment 2.

Setting of the position of the center of gravity of the head support member is explained by referring to FIG. 8. FIG. 8 is a diagram explaining the operation of the embodiment, and, as in embodiment 1, it is a sectional view showing two head support mechanisms 130 and one disk only. By reference to the axis of rotation of the rotation support part 11, the distance to the slider 1 is supposed to be L1, the distance to the balance member 16 to be L2, the mass of the slider 1 to be Mm1, and the mass of the balance member 16 to be Mm2. When the center of gravity of the support arm 2 is not located on the rotation support part 11, suppose the mass of the rotatable portion of the support arm 2 to be Mm8 and the distance from the rotation support part 11 to the rotatable portion to be L8. In this case, the mass Mm2 of the balance member 16 should be set so as to satisfy the formula L1×Mm=L2×Mm2+L8×Mm8. When the center of gravity of the support arm 2 is set so as to be located on the axis of rotation of the rotation support part 11, the mass Mm2 of the balance member 16 is set so as to satisfy the formula L1×Mm1=L2×Mm2.

In the head support mechanism 130 of the embodiment, however, the center of gravity $G_{130}$ of the head support member is, as schematically shown in FIG. 8, deviated from the position of the axis of rotation of the rotation support part 11, and is positioned within a plane perpendicular to the axis of rotation to the surface of the disk 112. In such configuration, when an impact force acts in direction Q in FIG. 8, as in the case of the head support mechanism 120 in embodiment 1, no rotating force about the axis of rotation of the rotation support part 11 occurs in the head support member. It hence prevents the slider 1 from colliding against the surface of the disk 112 to damage the head 1011 or disk 112. On the other hand, if an impact force acts in the horizontal direction, a rotational moment is caused, and a force acts in a direction of the head 1011 colliding against the disk 112. However, since the distance from the axis of rotation to the center of gravity $G_{130}$ is very short, the force generated by this rotational moment is also very small, so that the head 1011 or disk 112 will not be damaged.

The individual members are described. First, a base arm 12 is a single-body structure made of metal, such as stainless steel (SUS304), formed with a thickness of 64 μm. The base arm 12 may be formed, for example, by an etching process or a pressing process.

Meanwhile, in the leading end region of the base arm 12, a folding portion of about 0.2 mm in height may provided in a direction perpendicular to the surface of the disk 112, and the rigidity in the longitudinal direction may be enhanced. By using such base arm 12, its resonance frequency can be increased substantially from about 2 kHz of the prior art to about 10 kHz, and hence the rotating speed of the head support mechanism and the access speed can be further enhanced.

An amplifier circuit may be used as the balance member 16. At this time, the wiring between the head 1011 and amplifier circuit is formed on the support arm 2, and the wiring from the amplifier circuit is connected to the flexible wiring connection part 18a.

To improve the rigidity in the longitudinal direction of the support arm 2, a folding portion may be provided in the support arm 2 in a direction perpendicular to the surface of the disk 112. As the elastic member, the flat spring 4 is made of metal, such as stainless steel (SUS304), formed in a thickness of 38 μm. These members may be connected by any known method, such as a spot welding method, an ultrasonic welding method, or a laser welding method.

Embodiment 3

Figure 9:
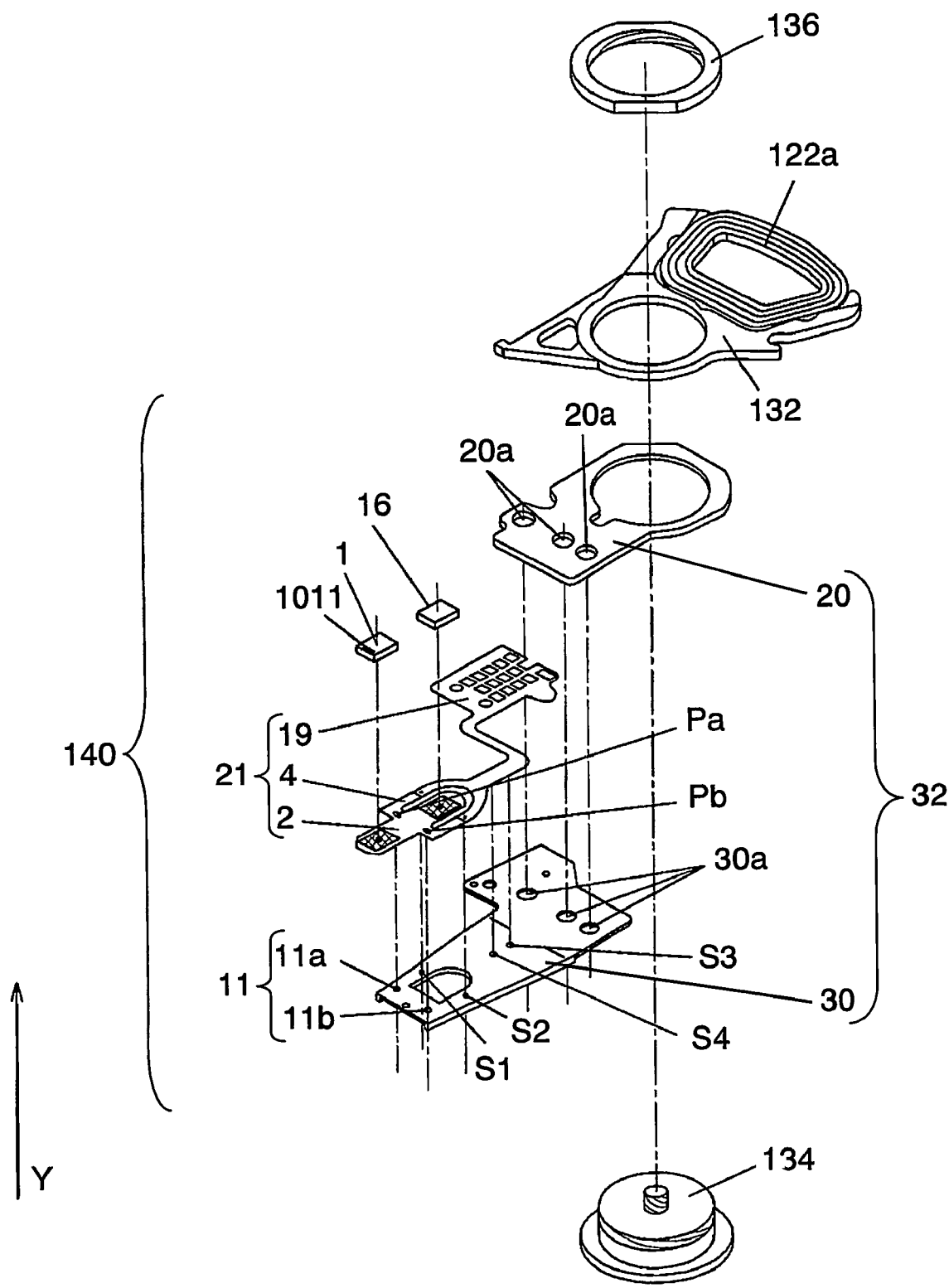
FIG. 9 is a perspective exploded view as seen from the disk surface side of the head support mechanism in embodiment 3 of the invention.
Figure 10:
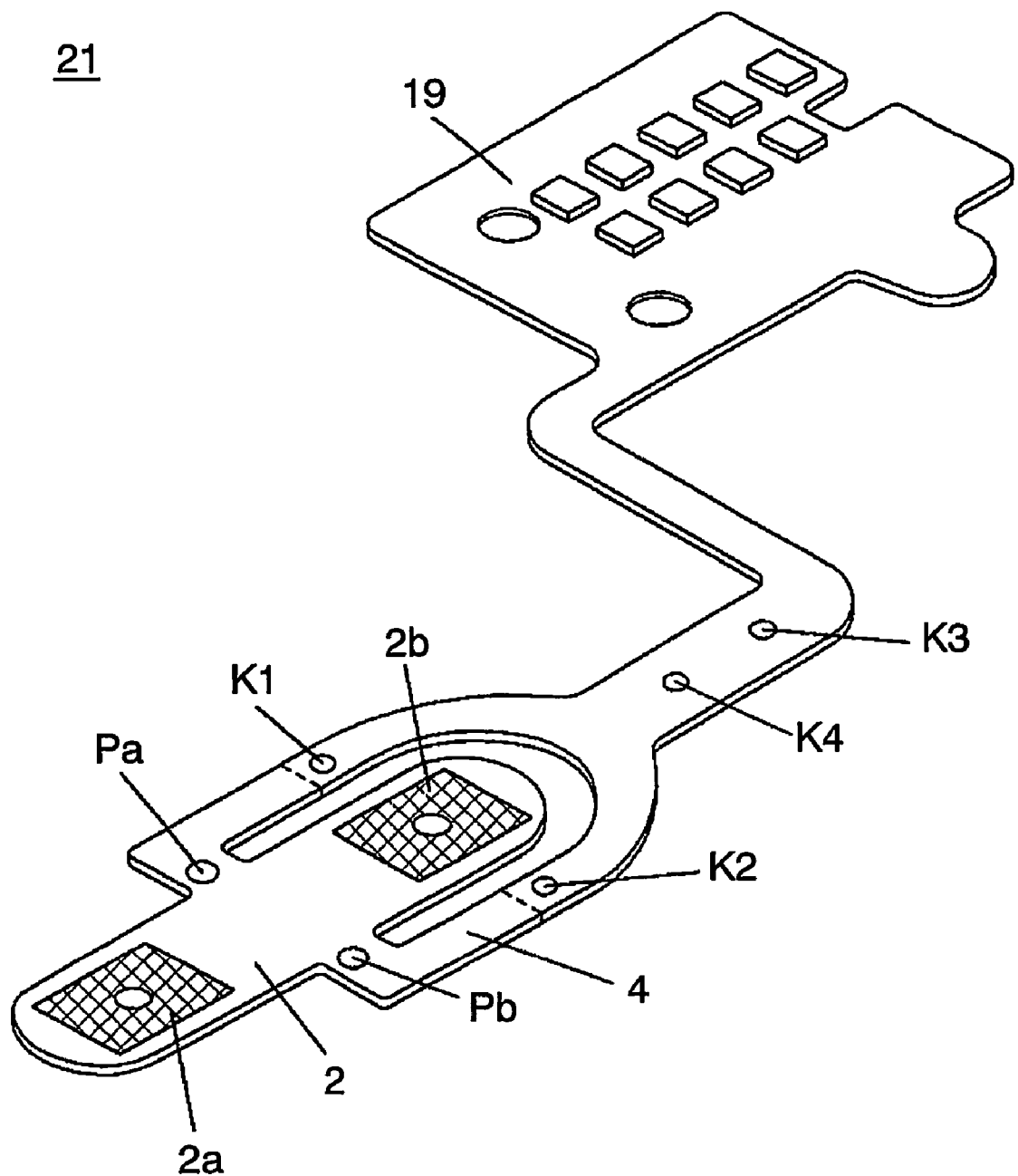
FIG. 10 is a perspective view showing a configuration of a wiring integrated type support member in embodiment 3.

FIG. 9 is a perspective exploded view of head support mechanism in embodiment 3 of the invention. A head support mechanism 140 is composed of a wiring-integrated type support member 21, a slider 1, a balance member 16, and a base arm 32. The wiring-integrated type support member 21 is a single-body structure of elastic member 4, support arm 2, and flexible wiring connection part 19. Its detailed structure is shown in FIG. 10. In this embodiment, the elastic member 4 is a flat spring integrally formed with the support arm 2. Hereinafter, the elastic member is explained as flat spring 4. The support arm 2 includes a region 2a for affixing the slider 1, and a region 2b for affixing the balance member 16, and the flat springs 4 as elastic members are disposed to enclose the region 2b for affixing the balance member 16. The flat springs 4 disposed at both sides are integrally connected, and extended up to the flexible wiring connection part 19. Although not shown, a wiring passing over the flat springs 4 is formed from the affixing regions 2a, 2b of the slider 1 and balance member 16 up to the flexible wiring connection part 19.

The base arm 32 is composed of a third base arm 30 provided with a pivot portion having a pair of apices 11a, 11b as rotation support part 11, and a fourth base arm 20 having a hole for insertion of a bearing part 134. The third base arm 30 and fourth base arm 20 are integrally formed, for example, by welding via individual holes 20a, 30a. Similarly, the portions from K1 to K4 of the wiring-integrated type support member 21 and the portions from S1 to S4 of the third base arm 30 are affixed to each other by, for example, laser welding.

In the support arm 2, the slider 1 mounting the head 1011 and the balance member 16 are adhered. At this time, it is configured so that the center of gravity of the head support member in a direction (Y-direction) perpendicular to the disk 112 may be positioned on a line linking the two apices 11a, 11b. In this embodiment, too, the head support member is composed of the slider 1 mounting the head 1011, support arm 2, and balance member 16. The third base arm 30 has the pivot portion as the rotation support part 11 having apices 11a, 11b.

The head support mechanism 140 and a second base arm 132 fixing a voice coil 122a are inserted onto the bearing part 134 in the shown sequence, and fixed with a threaded part 136, and a magnet (not shown) confronts the voice coil 122a, and hence a head drive device is composed.

Figure 11:
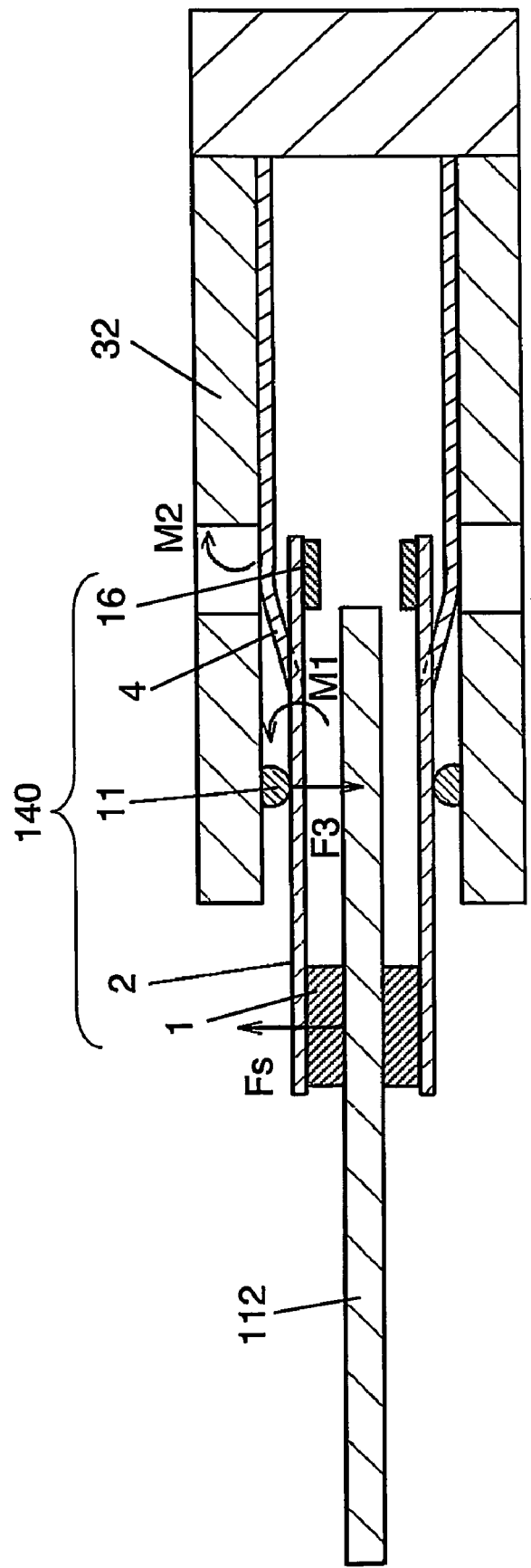
FIG. 11 is a diagram for explaining the operation of embodiment 3, being a sectional view showing two head support mechanisms and one disk only.

In such head support mechanism, the position of the center of gravity is explained by referring to FIG. 11. FIG.

11 is a diagram for explaining the operation of the embodiment, and, as in embodiment 1, it is a sectional view showing two head support mechanisms 140 and one disk only. In this configuration, the rotational moment M1 acts in a direction that would tend to cause the head support member to separate from the rotation support part 11. Accordingly, in the rotation support part 11, in order to increase the thrusting force for pressing the head support member, when the rotational moment M1 is increased, the reaction force Fs the slider 1 receives from the disk is also increased. Accordingly, when the action point of the rotational moment M1 is shifted to the slider 1 side, the thrusting force F3 in the rotation support part 11 increases, so that excessive force may not act on the slider 1. Hence it is also possible to suppress generation of fluctuation of the thrusting force acting on the slider 1 due to variation of relative height of the head support mechanism 140 and disk 112.

In the embodiments of the invention, there is no restriction on the manufacturing method of members or the connection method for connecting members. The support arm 2 may be formed by an etching method or a pressing method. The pivot portion may be formed by forming, pressing, or sputter deposition. An electrical wiring may be provided on the support arm 2. This wiring may be formed by adhering, etching or another process.

In the foregoing embodiments of the invention, the flat spring, support arm, and arm plate are processed by using single plate material, but the invention is not limited to such method alone. They may be fabricated separately, and later assembled, for example, by laser welding. In the case of such method, optimum material and thickness can be individually selected for the support arm and flat spring. Without using the balance member, moreover, the center of gravity of the head support member may be directly matched with the axis of rotation. As the elastic member, the flat spring integrally formed with the arm plate is described, but the invention is not limited to this alone. For example, a linear spring member may be used, or a plurality of linear spring members may be used. Or, instead of single layer of flat spring, a laminated structure of spring plate parts may be used.

In the embodiments of the invention, the head support mechanism of the magnetic disk apparatus using magnetic heads is explained, but the head support mechanism of the invention has the same effects also when used as the head support mechanism of a contact-free type disk recording and reproducing apparatus, such as an optical disk apparatus or magneto-optical disk apparatus.

In the embodiments of the invention, the rotation support part is described as the pivot portion composed of a pair of apices, but the invention is not limited to this alone. It may be composed of only one pivot, for example. In this case, by defining by both the actions of the pivot portion and elastic member, a configuration for rotating only in the vertical direction (direction perpendicular to the disk) can be easily realized. To the contrary, by forming more than two apices, a substantially wedge-shaped apex configuration may be formed.

In the embodiments of the invention, the pair of apices of the pivot portion as the axis of rotation are located at positions at right angles to the central line in the longitudinal direction of the support arm, but the invention is not limited to such configuration.

In the embodiments of the invention, the head is mounted on the slider, but the invention is not limited to this structure, and, for example, the head may be directly affixed to the support head.

INDUSTRIAL APPLICABILITY

As explained herein, in the head support mechanism of the invention, since the head support member can be provided directly on the base arm, a rigid portion and an elastic portion can be formed independently. Therefore, the support arm portion can be made of a member of high rigidity, and if an impact acts from outside, the slider is prevented from colliding against the disk. It is also possible to set arbitrarily the thrusting force of the elastic member to the slider, or set its resonance frequency high. It hence brings about tremendous effects of realizing a head support mechanism, a head drive device, and a disk apparatus extremely high in resistance to impact, high in response characteristic, and high in access speed.

The invention claimed is:

1. A head drive device for use in driving a head relative to a disk rotatable about a disk axis, comprising:
   a head support mechanism including a head support member having a support arm and a slider attached to one end portion of said support arm for at least one of recording on a disk and reproducing from a disk;
   a bearing part for rotatably supporting said head support mechanism for rotation in a direction parallel to a surface of the disk and about a bearing part axis parallel to but spaced apart from the disk axis; and
   a driving device arranged to rotate said head support mechanism in a direction parallel to the surface of the disk;
   wherein one end portion of a spring plate is connected to another end portion of said support arm, and another end portion of said spring plate is connected to a base arm for thrusting said slider in a direction of the disk;
   wherein said spring plate is arranged to bias said head support member toward said base arm such that one end portion of said base arm is contacted against said head support member;
   wherein another end portion of said base arm is supported on said bearing part for rotation about said bearing part axis;
   wherein a rotation support part is provided between said base arm and said support arm and defines a rotation axis of said head support member, said rotation axis being perpendicular to a plane defined by a longitudinal axis of said support arm and said bearing part axis, and said rotation axis is provided away from said slider;
   wherein the head is mounted on said slider and attached to said one end portion of said support arm by way of said slider; and
   wherein a balance member is formed at said another end portion of said support arm, and said head support member further includes said slider and the balance member.

2. The head drive device of claim 1,
   wherein said bearing part supports a plurality of head support mechanisms including said head support mechanism, and a head attached to an end portion of each of said plurality of said head support mechanisms confronts the surface of a respective disk.

3. The head drive device of claim 1,
   wherein said spring plate comprises a pair of flat springs disposed at opposite sides of said support arm, and said head support member is connected to one end portion of said base arm by said flat springs.

4. The head drive device of claim 1,
   wherein said balance member is formed of an amplifier circuit for amplifying an electric signal of the head.

5. A disk apparatus including said head drive device of claim 1, and further comprising:
the disk arranged such that the surface of said disk is disposed opposite said slider of said head support mechanism of said head drive device and such that said disk is rotatable about the disk axis; and
a rotation driving means for driving said disk;
wherein said head drive device is configured for one of writing in a specified track position of said disk and reading from a specified track position of said disk.

6. A head drive device for use in driving a head relative to a disk rotatable about a disk axis, comprising:
a head support mechanism including a head support member having a support arm and a slider attached to one end portion of said support arm for at least one of recording on a disk and reproducing from a disk;
a bearing part for rotatably supporting said head support mechanism for rotation in a direction parallel to a surface of the disk and about a bearing part axis parallel to but spaced apart from the disk axis; and
a driving device arranged to rotate said head support mechanism in a direction parallel to the surface of the disk;
wherein one end portion of a spring plate is connected to another end portion of said support arm, and another end portion of said spring plate is connected to a base arm for thrusting said slider in a direction of the disk;
wherein said spring plate is arranged to bias said head support member toward said base arm such that one end portion of said base arm is contacted against said head support member;
wherein another end portion of said base arm is supported on said bearing part for rotation about said bearing part axis;
wherein a rotation support part is provided between said base arm and said support arm and defines a rotation axis of said head support member, said rotation axis being perpendicular to a plane defined by a longitudinal axis of said support arm and said bearing part axis, and said rotation axis is provided away from said slider; and
wherein said rotation support part is part of said base arm, and a position of a center of gravity of said head support member is disposed within a vertical plane drawn from said rotation axis defined by said rotation support part.

7. The head drive device of claim 6,
wherein said bearing part supports a plurality of head support mechanisms including said head support mechanism, and a head attached to an end portion of each of said plurality of said head support mechanisms confronts the surface of a respective disk.

8. The head drive device of claim 6,
wherein said spring plate comprises a pair of flat springs disposed at opposite sides of said support arm, and said head support member is connected to one end portion of said base arm by said flat springs.

9. The head drive device of claim 6,
wherein the head is mounted on said slider and attached to one end portion of the support arm by way of said slider.

10. A disk apparatus including said head drive device of claim 6, and further comprising:
the disk arranged such that the surface of said disk is disposed opposite said slider of said head support mechanism of said head drive device and such that said disk is rotatable about the disk axis; and
a rotation driving means for driving said disk;
wherein said head drive device is configured for one of writing in a specified track position of said disk and reading from a specified track position of said disk.

11. A head drive device for use in driving a head relative to a disk rotatable about a disk axis, comprising:
a head support mechanism including a head support member having a support arm and a slider attached to one end portion of said support arm for at least one of recording on a disk and reproducing from a disk;
a bearing part for rotatably supporting said head support mechanism for rotation in a direction parallel to a surface of the disk and about a bearing part axis parallel to but spaced apart from the disk axis; and
a driving device arranged to rotate said head support mechanism in a direction parallel to the surface of the disk;
wherein one end portion of a spring plate is connected to another end portion of said support arm, and another end portion of said spring plate is connected to a base arm for thrusting said slider in a direction of the disk;
wherein said spring plate is arranged to bias said head support member toward said base arm such that one end portion of said base arm is contacted against said head support member;
wherein another end portion of said base arm is supported on said bearing part for rotation about said bearing part axis;
wherein a rotation support part is provided between said base arm and said support arm and defines a rotation axis of said head support member, said rotation axis being perpendicular to a plane defined by a longitudinal axis of said support arm and said bearing part axis, and said rotation axis is provided away from said slider; and
wherein said rotation support part is formed at said base arm, and a position of a center of gravity of said head support member is located on said rotation axis defined by said rotation support part.

12. The head drive device of claim 11,
wherein said bearing part supports a plurality of head support mechanisms including said head support mechanism, and a head attached to an end portion of each of said plurality of said head support mechanisms confronts the surface of a respective disk.

13. The head drive device of claim 11,
wherein said spring plate comprises a pair of flat springs disposed at opposite sides of said support arm, and said head support member is connected to one end portion of said base arm by said flat springs.

14. The head drive device of claim 11,
wherein the head is mounted on said slider and attached to one end portion of the support arm by way of said slider.

15. A disk apparatus including said head drive device of claim 11, and further comprising:
the disk arranged such that the surface of said disk is disposed opposite said slider of said head support mechanism of said head drive device and such that said disk is rotatable about the disk axis; and
a rotation driving means for driving said disk;
wherein said head drive device is configured for one of writing in a specified track position of said disk and reading from a specified track position of said disk.

16. A head drive device for use in driving a head relative to a disk rotatable about a disk axis, comprising:
a head support mechanism including a head support member having a support arm and a slider attached to one end portion of said support arm for at least one of recording on a disk and reproducing from a disk;
a bearing part for rotatably supporting said head support mechanism for rotation in a direction parallel to a surface of the disk and about a bearing part axis parallel to but spaced apart from the disk axis; and
driving device arranged to rotate said head support mechanism in a direction parallel to the surface of the disk;
wherein one end portion of a spring plate is connected to another end portion of said support arm, and another end portion of said spring plate is connected to a base arm for thrusting said slider in a direction of the disk;
wherein said spring plate is arranged to bias said head support member toward said base arm such that one end portion of said base arm is contacted against said head support member;
wherein another end portion of said base arm is supported on said bearing part for rotation about the bearing part axis;
wherein a rotation support part is provided between said base arm and said support arm and defines a rotation axis of said head support member, said rotation axis being perpendicular to a plane defined by a longitudinal axis of said support arm and said bearing part axis, and said rotation axis is provided away from said slider; and
wherein said spring plate is provided between said base arm and said support arm.

17. The head drive device of claim 16,
wherein said bearing part supports a plurality of head support mechanisms including said head support mechanism, and a head attached to an end portion of each of said plurality of said head support mechanisms confronts the surface of a respective disk.

18. The head drive device of claim 16,
wherein said spring plate comprises a pair of flat springs disposed at opposite sides of said support arm, and said head support member is connected to one end portion of said base arm by said flat springs.

19. The head drive device of claim 16,
wherein the head is mounted on said slider and attached to one end portion of the support arm by way of said slider.

20. The head drive device of claim 16,
wherein said spring plate and said support arm are in an integrally formed structure.

21. A disk apparatus including said head drive device of claim 20, and further comprising:
the disk arranged such that the surface of said disk is disposed opposite said slider of said head support mechanism of said head drive device and such that said disk is rotatable about the disk axis; and
a rotation driving means for driving said disk;
wherein said head drive device is configured for one of writing in a specified track position of said disk and reading from a specified track position of said disk.

22. A disk apparatus including said head drive device of claim 16, and further comprising:
the disk arranged such that the surface of the disk is disposed opposite said slider of said head support mechanism of said head drive device and such that said disk is rotatable about the disk axis; and
a rotation driving means for driving said disk;
wherein said head drive device is configured for one of writing in a specified track position of said disk and reading from a specified track position of said disk.

23. A head drive device for use in driving a head relative to a disk rotatable about a disk axis, comprising:
a head support mechanism including a head support member having a support arm and a slider attached to one end portion of said support arm for at least one of recording on a disk and reproducing from a disk;
a bearing part for rotatably supporting said head support mechanism for rotation in a direction parallel to a surface of the disk and about a bearing part axis parallel to but spaced apart from the disk axis; and
a driving device arranged to rotate said head support mechanism in a direction parallel to the surface of the disk;
wherein one end portion of a spring plate is connected to another end portion of said support arm, and another end portion of said spring plate is connected to a base arm for thrusting said slider in a direction of the disk;
wherein said spring plate is arranged to bias said head support member toward said base arm such that one end portion of said base arm is contacted against said head support member;
wherein another end portion of said base arm is supported on said bearing part for rotation about said bearing part axis;
wherein a rotation support part is provided between said base arm and said support arm and defines a rotation axis of said head support member, said rotation axis being perpendicular to a plane defined by a longitudinal axis of said support arm and said bearing part axis, and said rotation axis is provided away from said slider;
wherein said rotation support part comprises a pair of pivot portions, and a contacting point at which an apex of said pair of pivot portions contacts with said support arm is used as a fulcrum; and
wherein said head support member is arranged to be rotatable at said fulcrum in a direction perpendicular to a surface of the disk.

24. The head drive device of claim 23,
wherein said bearing part supports a plurality of head support mechanisms including said head support mechanism, and a head attached to an end portion of each of said plurality of said head support mechanisms confronts the surface of a respective disk.

25. The head drive device of claim 23,
wherein said spring plate comprises a pair of flat springs disposed at opposite sides of said support arm, and said head support member is connected to one end portion of said base arm by said flat springs.

26. The head drive device of claim 23,
wherein the head is mounted on said slider and attached to one end portion of the support arm by way of said slider.

27. The head drive device of claim 23,
wherein said spring plate and said support arm are in an integrally formed structure.

28. A disk apparatus including said head drive device of claim 23, and further comprising:
the disk arranged such that the surface of said disk is disposed opposite said slider of said head support mechanism of said head drive device and such that said disk is rotatable about the disk axis; and
a rotation driving means for driving said disk;
wherein said head drive device is configured for one of writing in a specified track position of said disk and reading from a specified track position of said disk.

* * * * *